United States Patent [19]

Megraw

[11] 3,996,325

[45] Dec. 7, 1976

[54] PREPARATION OF A THREE LAYER, FIRE RETARDANT PARTICLEBOARD

[75] Inventor: Robert A. Megraw, Seattle, Wash.

[73] Assignee: The Dow Chemical Company, Midland, Mich.

[22] Filed: May 28, 1974

[21] Appl. No.: 474,001

Related U.S. Application Data

[63] Continuation of Ser. No. 112,778, Feb. 4, 1971, abandoned.

[52] U.S. Cl. .............................. 264/113; 156/62.2; 162/142; 162/159; 162/225; 264/122; 428/535; 428/921
[51] Int. Cl.² ...................... B29J 5/00; D21J 1/08; D21J 1/16
[58] Field of Search .......... 162/159, 183, 166, 225, 162/181 R, 181 A; 264/122, 150, 142, 113; 428/920, 195, 921, 534, 535; 106/15 FP; 156/62.2, 62.8

[56] References Cited

UNITED STATES PATENTS

| | | | |
|---|---|---|---|
| 1,892,472 | 12/1932 | Rafton | 162/183 X |
| 2,030,653 | 2/1936 | Quinn | 162/159 X |
| 2,851,730 | 9/1958 | Wilhelmi et al. | 264/113 |
| 3,245,870 | 4/1966 | Orth et al. | 162/159 |
| 3,438,847 | 4/1969 | Chase | 162/159 X |
| 3,535,199 | 10/1970 | Kuhr et al. | 428/921 X |
| 3,674,596 | 4/1972 | McMinimy | 428/921 X |

*Primary Examiner*—S. Leon Bashore
*Assistant Examiner*—Arthur L. Corbin
*Attorney, Agent, or Firm*—Christensen, O'Connor, Garrison & Havelka

[57] ABSTRACT

Fire retardant reconstituted cellulosic products are produced having fire retardancy substantially equal to conventional fire retardant products by impregnation of a portion of bark with a fire retardant and mixing said impregnated bark portion with another portion of bark which is untreated with a fire retardant. Additionally, a portion of wood chips is impregnated with a fire retardant and mixed with another portion of wood chips untreated with a fire retardant. Subsequently, the combined portions of bark and wood chips are formed into a three layer composite particleboard, having a bark core and wood chip surface, by pressing and heating.

1 Claim, No Drawings

PREPARATION OF A THREE LAYER, FIRE RETARDANT PARTICLEBOARD

BACKGROUND OF THE INVENTION

This is a continuation of application Ser. No. 112,778 filed February 4, 1971, and entitled "Fire Retardant Particleboard and Method of Production," now abandoned.

This invention relates to fire retardant reconstituted cellulosic materials and a method of preparing such materials. This invention further relates to a method of imparting fire retardancy to reconstituted cellulosic base paper, nonwoven fabric, board, and particleboard products in which the total amount of furnish handling is decreased while providing a resulting product which has a substantially higher strength than conventionally produced fire retardant paper and board products.

Prior Art

It is customary to impart fire retardancy to reconstituted paper and board products either by impregnating the finished product with fire retardant materials or by treating all of the product furnish used in the preparation of the paper and board product with a fire retardant chemical. In the latter case, either all of the furnish is treated usually with an aqueous solution of the fire retardant or the fire retardant chemical is applied in a dry or semi-dry state as an additive with the adhesive system. Either of these methods result in the fire retardant chemical being distributed uniformly throughout the matrix of the product upon all of the furnish. The product so produced frequently has a drastically decreased strength due to the detrimental effects of the fire retardant chemical upon the adhesion characteristics of the cellulosic material making up the furnish and the adhesive system utilized. Similarly, the presence of fire retardant chemicals throughout the matrix has a deleterious effect on fiber strength, surface characteristics and other product properties.

Flame combustion and therefore the flame spread does not occur within a wood based product itself; rather, it takes place externally to the product's surface in the gasses and vapors evolved when the product is sufficiently heated. The ability or failure of a flame front to sustain itself depends upon whether or not enough heat is generated by the burning volatiles to provide for pyrolytic release of additional flammable volatiles. Thus, the more heat energy liberated from the combusted volatiles, the faster the flame front will move; if the energy output falls below the critical level necessary to perpetuate the process of pyrolytic release of additional flammable volatiles, the system will become self-extinguishing.

When a fire retarding chemical is introduced into a wood base product, it changes its normal combustion pattern by altering the composition of the heat-induced gasses and vapors, which in turn lowers the amount of the heat energy put back into the system when these volatiles themselves are combusted. Flame spread is thus curtailed or eliminated. It is commonly known that the degree of alteration which occurs in the rate of flame spread is dependent upon the kind and amount of chemical retardant added. Heretofore, the flame retardant chemicals have been evenly distributed throughout the matrix of the wood base product, resulting in deleterious effect upon the product quality. Certain types of fire retardant chemicals could not be used in the prior art methods since severe effects upon strength and other product characteristics resulted upon homogeneous treatment.

It has now been discovered that in addition to the two variables of the type of flame retardant material and the amount of chemical retardant added, a third variable heretofore unrecognized enters into the flame retardancy imparted by treatment of wood base products. This third variable comprises the parameter of distribution of the flame retardant chemicals within the matrix of the wood product and it has been found that the distribution can be manipulated to advantage. Just as one can alter the combustion energy balance by applying overall chemical treatment, one can accomplish a similar end by not altering the system at all in some areas while severely altering the flame propagation characteristics of surrounding areas.

SUMMARY OF THE INVENTION

This invention comprises treating only a portion of the furnish utilized in the preparation of reconstituted cellulose products with a solution of chemical flame retardant materials. The treatment used deposits a higher percentage of retardant in the treated furnish than used in the prior art. Incorporating a higher percentage of retardant into only a portion of the furnish results in usage of an approximately equal average amount of fire retardant chemical to that used in the prior art. However, in the process of this invention, all of the retardant chemical is concentrated into discrete locations within the cellulosic base product. This procedure has the advantages of requiring less total furnish to be handled in the treating process since only a portion receives treatment, improving the bonding efficiency of the adhesive since the untreated furnish is unaffected by the retardant and providing the opportunity for mixing untreated furnish together with furnish from two or more different treatments or levels of treatment. The overall efficiency of the fire retardant chemical is thus maximized and the deleterious effects of the fire retardant chemical on bonding ability, fiber strength, surface characteristics or other product properties is minimized. It is desirable that at least 10% of the board furnish be treated with the fire retardant material. A superior product will usually be obtained when 20% or more of the furish is treated. This process may be applied equally well to many reconstituted wood products. For example, hardboard, fiberboard, nonwoven cellulosic materials, particleboard, paper and the like may all be treated in this process.

Many materials having fire retardant properties when incorporated in cellulose base products can be used in this invention. Well known fire retardant chemicals which cannot be used in prior art processes due to the severe effect upon finished product quality can be used in the process of this invention without unduly affecting the product quality. A representative listing of some of the many chemical fire retardants would include hydrated borax, diammonium phosphate, various of the hydrated borates, boric acid, ammonium sulfate, ammonium phosphate, dicyandiamidephosphoric acid [$NH_2C(NH)$ $(NHCN)$—$H_3PO_4$], zinc chloride tetrakis(hydroxymethyl)phosphonium chloride [$(HOCH_2)_4PCL$] and combinations thereof and other materials may also be used to advantage.

Of course, any material, organic or inorganic which imparts flame resistance to cellulosic products and which is soluble in a solvent compatible enough with cellulose base materials to permit substantial impregnation of the cellulosic materials may be used. The above list is not to be presumed to be exhaustive of the fire retardant materials useful in this invention but rather is intended to provide a sampling of some of those fire retardant materials which may find use in this invention.

This invention has been found to be particularly advantageous when used to enhance the natural flame retardant characteristics of bark-type materials which may be used as one constituent in the furnish supplied to particleboard pressing machines. The use of bark in large quantities in particleboard has a deleterious effect upon the strength of the resulting particleboard due to the inherently low strength characteristics of the bark material. Adding a fire retardant chemical material such as borax, diammonium phosphate or other salts by the prior art techniques of homogeneous distribution upon all the furnish results in a further deleterious effect on the strength properties of the finished particleboard product. In fact, the finished bark-chip particleboard treated with a fire retardant salt by the prior art methods frequently possesses such low strength characteristics as to be unusable in many applications. By using the method of this invention to treat only a portion of the furnish which is supplied to the particleboard pressing apparatus it is possible to obtain a relatively high strength bark-chip particleboard with enhanced fire retardancy. Treatment of a portion of the bark and a portion of the other cellulosic material results in enhanced fire retardancy while minimizing adverse effects upon the strength characteristics of the finished product.

tion being discarded to facilitate further handling and board uniformity. Four batches of diammonium phosphate impregnated chips were prepared by impregnation with an aqueous solution of diammonium phosphate to concentrations of 42.2, 28.8, 20.4 and 13.2 percent salt based on oven dry chip weight. From each batch of treated chips, several sets of two particleboards each were made up by thoroughly mixing various ratios of treated to untreated chips. All boards were pressed 13 × 13 × ⅜ inches containing 40 lbs./cu.ft. of chips on an oven dry basis with 6% urea formaldehyde resin solids as a binder. The two foot tunnel test is described in an article by H. L. Vandersael, *Jour. of Paint Technology*, 39, No. 511 (Aug., 1967), pp. 494–500. Results are seldom exactly comparable between different tunnels but are closely reproducible when run in a given tunnel using a rigidly standardized procedure, as were the samples reported herein. One particular modification of the tunnel that aided in more accurately measuring flame spread values was the use of a time lapse infrared camera taking photographs of the burning specimens at five second intervals. Tunnel furnace specimens were prepared from each board and all samples were then conditioned in 50% relative humidity atmosphere at 70° F. Duplicate samples were burned in a two-foot tunnel furnace under controlled conditions. Flame spread and end-of-tunnel temperature were recorded throughout the burning of each sample. Weights were taken just prior to burning, immediately after burning and after again being equilibrated in a 50% relative humidity atmosphere at 70° F. The results of the flame spread and weight loss tests are presented below in Table I.

TABLE I

PARTICLEBOARD FIRE RETARDANCY AND WEIGHT LOSS

| Total % Salt in Board[1] | % Salt in Treated Chips[1] | % Chips Containing Treatment | FLAME SPREAD[2] 5 Minute Burning Time | | | Total Wt. Loss After Burning | WEIGHT LOSS - GRAMS (Lower ½ of Sample) Loss Due To Charring of Wood + Salt | Loss Due To Moisture |
|---|---|---|---|---|---|---|---|---|
| | | | Set I | Set II | Avg. | | | |
| 20 % | 20.4 % | 100.0 % | 10 | 10 | 10 | 16.1 | 13.4 | 2.7 |
| 20 | 42.2 | 47.4 | 10 | 11 | 10.5 | 15.8 | 12.6 | 2.8 |
| 15 | 20.4 | 73.5 | 12 | 11 | 11.5 | 17.2 | 15.2 | 2.1 |
| 15 | 28.8 | 52.2 | 11.5 | 13 | 12 | 17.6 | 14.7 | 2.9 |
| 15 | 42.2 | 35.5 | 11 | 12 | 11.5 | 17.1 | 13.9 | 3.2 |
| 10 | 13.2 | 81.8 | 11 | 11 | 11 | 19.3 | 16.4 | 2.9 |
| 10 | 20.4 | 49.0 | 14 | 13.5 | 14 | 20.3 | 17.3 | 3.2 |
| 10 | 28.8 | 34.7 | 14 | 15.5 | 14.5 | 19.7 | 15.3 | 3.8 |
| 10 | 42.2 | 23.7 | 12.5 | 13 | 13 | 17.9 | 14.8 | 3.2 |
| 0 | 0 | 0 | 21.5 | 20.5 | 21 | 24.9 | 20.6 | 4.2 |

[1]Percent by weight diammonium phosphate, oven dry basis.
[2]Flame travel in inches longitudinally along sample.

This invention may be more clearly understood by a detailed evaluation of the discussion which follows relating to particular embodiments of the invention. It is not intended, however, that the invention be limited to these preferred embodiments which are presented here only as examples of the invention. The following examples relate specifically to particleboard, however, it is understood that the method of this invention is equally applicable to other types of reconstituted cellulose-base products.

EXAMPLE I

Particleboard samples were prepared by the following processing steps. Douglas fir particleboard furnish was obtained from a standard particleboard plant and was sifted on a No. 14 mesh screen with the fines por- It is apparent from the experimental results shown in Table I that for each total salt content substantially equivalent flame retardancy was obtained through the process of this invention in which only a portion of the furnish was treated and the prior art method of homogeneous treatment, particularly at the 15% and 20% treatment levels. Thus treatment of only a portion of the furnish provides the advantage of handling much less of the furnish in the fire retardant material treatment step while resulting in acceptable flame retardancy in the finished product using the same overall amount of fire retardant material.

EXAMPLE II

Relative strength properties of fire retardant particleboard made using a borax salt as the retardant chemical were conducted to determine the effect of the method of this invention upon strength characteristics. Three series of samples were prepared using normal particleboard preparation techniques. Furnish comprising Douglas fir chips was sifted on No. 14 mesh screen and the fines portion discarded. Three separate sets of particleboard samples were prepared in an identical manner with the exception that the first group contained no borax treatment. The second group contained a borax treatment giving a total salt content in the board of 11% in which all of the chips used in preparing the particleboard were equally treated with borax. The third group of samples were treated with borax salt to give a total board salt content of 11% but only 20% of the chips were treated with borax. The results of various types of strength tests are presented below in Table II showing the relative strength property of the three types of particleboards.

TABLE II

RELATIVE STRENGTH PROPERTIES OF FIRE RETARDANT PARTICLEBOARD MADE FROM BORAX TREATED CHIPS

| Board Type[1] | | | FINAL[5] | | | |
|---|---|---|---|---|---|---|
| % of Chips Treated | % Salt in Total Board | % Salt in Treated Chips | DENSITY lb/ft$^3$ | MOR[2] lb/in$^2$ | MOE[3] lb/in$^2$ | IB[4] lb/in$^2$ |
| 0 % | 0 % | — | 40.7 | 1690 | 2.19 × 10$^5$ | 103 |
| 0 % | 0 % | — | 41.4 | 1780 | 2.52 × 10$^5$ | 129 |
| 0 % | 0 % | — | 41.5 | 1760 | 2.54 × 10$^5$ | 143 |
| 0 % | 0 % | — | 41.5 | 1840 | 2.38 × 10$^5$ | 115 |
| 100 % | 11 % | 11 % | 38.7 | 450 | 1.40 × 10$^5$ | 14 |
| 100 % | 11 % | 11 % | 38.6 | 410 | 1.24 × 10$^5$ | 21 |
| 100 % | 11 % | 11 % | 38.6 | 420 | 1.09 × 10$^5$ | 13 |
| 100 % | 11 % | 11 % | 39.0 | 420 | 1.35 × 10$^5$ | 15 |
| 20 % | 11 % | 54 % | 42.8 | 1400 | 3.26 × 10$^5$ | 89 |
| 20 % | 11 % | 54 % | 43.0 | 1470 | 3.32 × 10$^5$ | 87 |
| 20 % | 11 % | 54 % | 43.4 | 1440 | 3.18 × 10$^5$ | 97 |
| 20 % | 11 % | 54 % | 43.2 | 1370 | 3.20 × 10$^5$ | 93 |

[1] All percents are expressed on an oven dry untreated chip weight basis.
[2] Modulus of Rupture.
[3] Modulus of Elasticity.
[4] Internal Bond Strength.
[5] Final density at test time, including wood, salt, moisture.

A binder of urea resin solids in the amount of 6% by weight on an oven dry chip basis was utilized. Each board had dimensions of 9 × 12 × ⅜. The salt utilized in each instance was borax ($Na_2B_4O_7 \cdot 10H_2O$).

It is apparent from the data presented above in Table II that very significant increases in strength in the fire retardant particleboard are obtained when the method of this invention is utilized. The somewhat lower densities of the samples in which all of the chips were treated would account for a small amount of the observed decrease in strength but would not begin to account for differences of the magnitude observed. The substantial increase in strength exhibited by the comparative modulus of rupture, modulus of elasticity and internal bond strength tests indicates that the severe deleterious effects of the fire retardant salts on bonding strength is decreased by treatment of only a portion of the total furnish provided to the particleboard preparation equipment.

EXAMPLE III

Particleboards were made by using combinations of wood chips and ground bark to take advantage of the inherent flame retardant characteristics of bark and to evaluate the combined effect of bark content and fire retardant salts when placed into particleboard using the prior art method and the method of this invention. The boards were prepared by standard particleboard preparation techniques with the exception that certain of the samples were prepared with fire retardant salt administered to only a portion of the furnish whereas other samples were treated by the prior art process of homogeneous treatment or had no salt content at all. Specifically, the samples "A" comprised a 100% untreated chip control. Samples "B" were 100% untreated bark control. Samples "C" were composite samples in which the outer two surfaces were made from chips all treated with 14.2% diammonium phosphate flame retardant by weight. The outer two surfaces made up one quarter of the total board weight. The center three-quarters of each board in sample "C" was composed of bark containing 6.9% by weight diammonium phosphate fire retardant salt evenly dispersed throughout. Thus, both the wood and bark furnish for the sample were uniformly treated and the total boards contained 8.7% average salt on an oven dry basis. Samples labeled "D" were identical to those samples labeled "C" but contained no fire retardant salt.

Samples labeled "E" similarly were one-quarter by weight chip outer surface and three-quarters bark inner core. In this case, however, the wood chip outer surfaces were mixtures of 50% by weight untreated chips combined with 50% by weight chips treated with 26.8% by weight diammonium phosphate salt. The center portion was a mixture of 60% untreated bark and 40% bark containing 14.2% diammonium phosphate. Samples labeled "F" are boards having a homogeneous treatment exceeding 20% of boric acid. These data are included as representative of the flame spread characteristics of a commercial particleboard product known to possess an Underwriters Laboratory Class I fire retardant rating. Because of the different retardant chemical and since the manufacturing process was not identical, the data from sample "F" should not otherwise be directly compared with samples "A–E." All samples were burned in a two-foot tunnel furnace using similar technique to that described above for Example I. All boards were made with 8% urea formaldehyde resin solid binder based on the oven dry furnish weight. Moisture content of the furnish was approximately 9% prior to board making. The results of laboratory experiments on flame spread data are presented below in Table III.

TABLE III

| Sample | Description | Salt | Salt %[3] (Avg.) | Board Thickness Inches | Density[5] | Flame Spread[2] I | II | Avg. |
|---|---|---|---|---|---|---|---|---|
| A | 100 % Untreated Chips | — | 0 | ½ | 40 | 22 | 22 | 22 |
| B | 100 % Untreated Bark | — | 0 | ½ | 40 | 15.5 | — | 15.5 |
| C[1] | Bark Core 100 % Treated Chip Surface 100 % Treated | Diammonium Phosphate | 8.7 | ½ | 40 | 12 | 12 | 12 |
| D[1] | Bark Core Untreated Chip Surface Untreated | — | 0 | ½ | 40 | 18 | 18 | 18 |
| E[1] | Bark Core 40 % Treated Chip Surface 50 % Treated | Diammonium Phosphate | 3.1 | ½ | | 11.5 | 12 | 12 |
| F | Commercially Produced Core Material[4] | Boric Acid | 20 | ⅜ | 40 | 12.5 | 13 | 12.5 |

[1]Core comprised 75 % of particleboard weight and was placed between two surface layers of wood chips particleboard. (See text for explanation of treatment.)
[2]Two runs were made for each type of board. Flame spread values equal actual distance of flame travel in five minutes on sample in a two-foot tunnel furnace.
[3]Percent of board weight on an oven dry basis.
[4]U.L. Class 1 fire retardant rating.8 % Urea formaldehyde resin binder based on oven dry chip weight.
[5]Density in lb/ft³ oven dry furnish weight basis.

It can be readily seen from the data presented in Table III above that the composite bark-core sample "E" has substantially identical flame spread characteristics as does bark-chip sample "C" indicating that the intermittent treatment utilized in sample "E" provides substantially equal flame spread characteristics to a particleboard produced in the prior art method of uniform treatment throughout. The sample "E" produced a board having substantially higher strength than the board produced under "C," although the quantitative evaluation of the samples was not performed. More importantly, the method provided by this invention permits the handling of only a portion of the furnish in the fire retardant chemical treatment step so that the cost of handling of the furnish is substantially decreased for preparation of fire resistant particleboard. Similarly, with any other type of cellulosic based product which is treated by the method of this invention to impart flame retardancy, a substantial portion of the furnish need not be handled in the steps preliminary to forming the board, nonwoven fabric, paper, particleboard or the like.

I claim:

1. A method of preparing a composite, flame retardant particleboard from cellulosic furnish comprising the steps of:

impregnating a first portion of cellulosic furnish consisting essentially of bark with an aqueous solution of diammonium phosphate whereby said first portion of bark, when dried to oven dry moisture content, contains approximately 14 percent diammonium phosphate by weight;

mixing said first portion containing diammonium phosphate with a second portion of cellulosic furnish consisting essentially of bark, said second portion being untreated with a fire retardant substance, the mixed first and second portion comprising approximately 60% by weight untreated bark and 40% by weight treated bark and being combined with about 8 percent by weight urea formaldehyde resin binder;

impregnating a third portion of cellulosic furnish consisting essentially of wood chips with an aqueous solution of diammonium phosphate whereby said third portion of chips, when dry to oven dry moisture content, contains from about 20 to about 40 percent by weight diammonium phosphate;

mixing said third portion of furnish containing diammonium phosphate with a fourth portion of furnish consisting essentially of wood chips, said fourth portion being untreated with a fire retardant substance, said third and said fourth portions being combined in approximately equal amounts and then mixed with about 8 percent by weight urea formaldehyde resin binder; and then forming the combined wood chips and combined bark into a three layer composite board having a bark core and wood chip surface by pressing and heating whereby a particleboard is formed having improved fire retardancy without substantial degradation of the strength of said board due to the presence of the fire retardant material in a portion of the furnish forming the completed board.

* * * * *